May 16, 1967 T. IAVELLI ETAL 3,319,479
MULTIPLE SPEED POWER TRANSMISSION MECHANISM
Filed Aug. 25, 1964 3 Sheets-Sheet 2
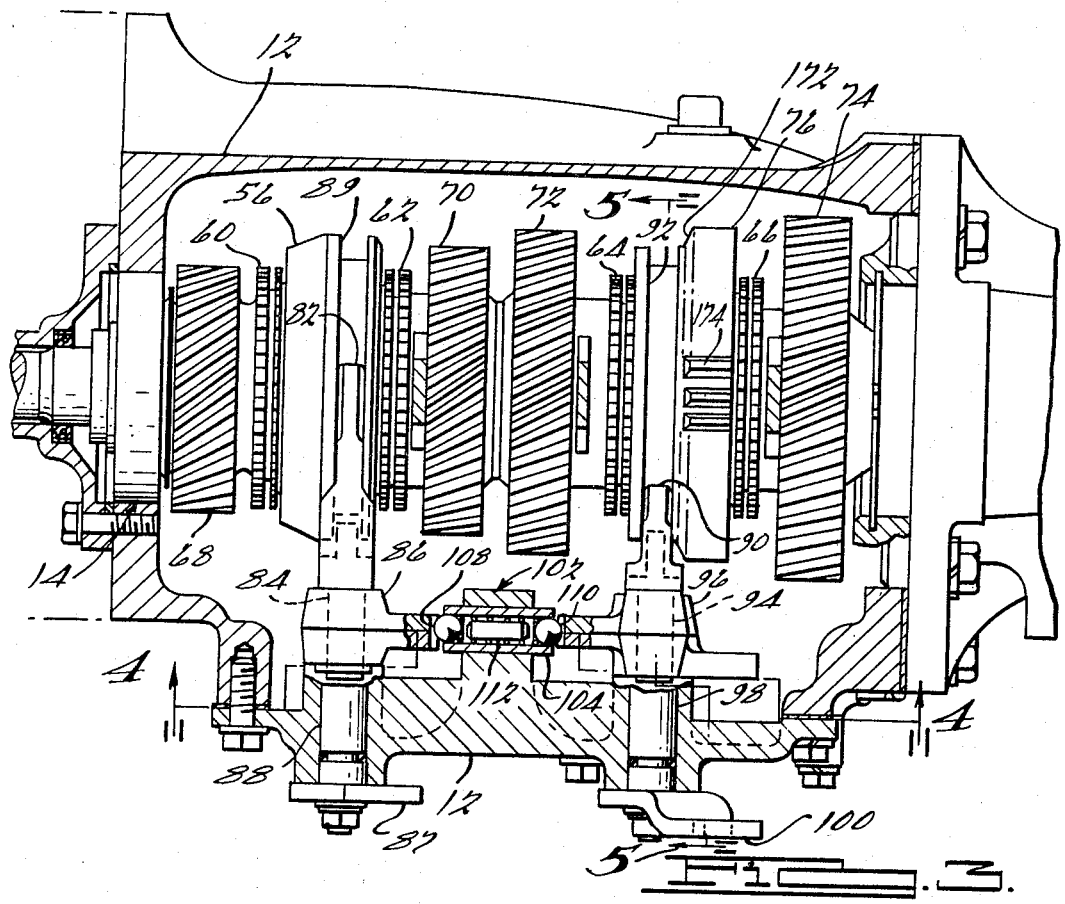
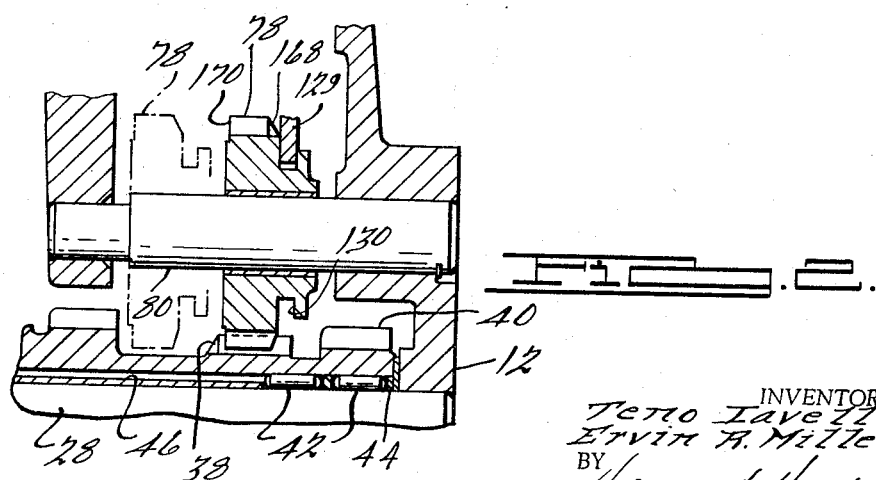
INVENTORS.
Teno Iavelli.
Ervin R. Miller.
BY
Harness & Harris
ATTORNEYS.

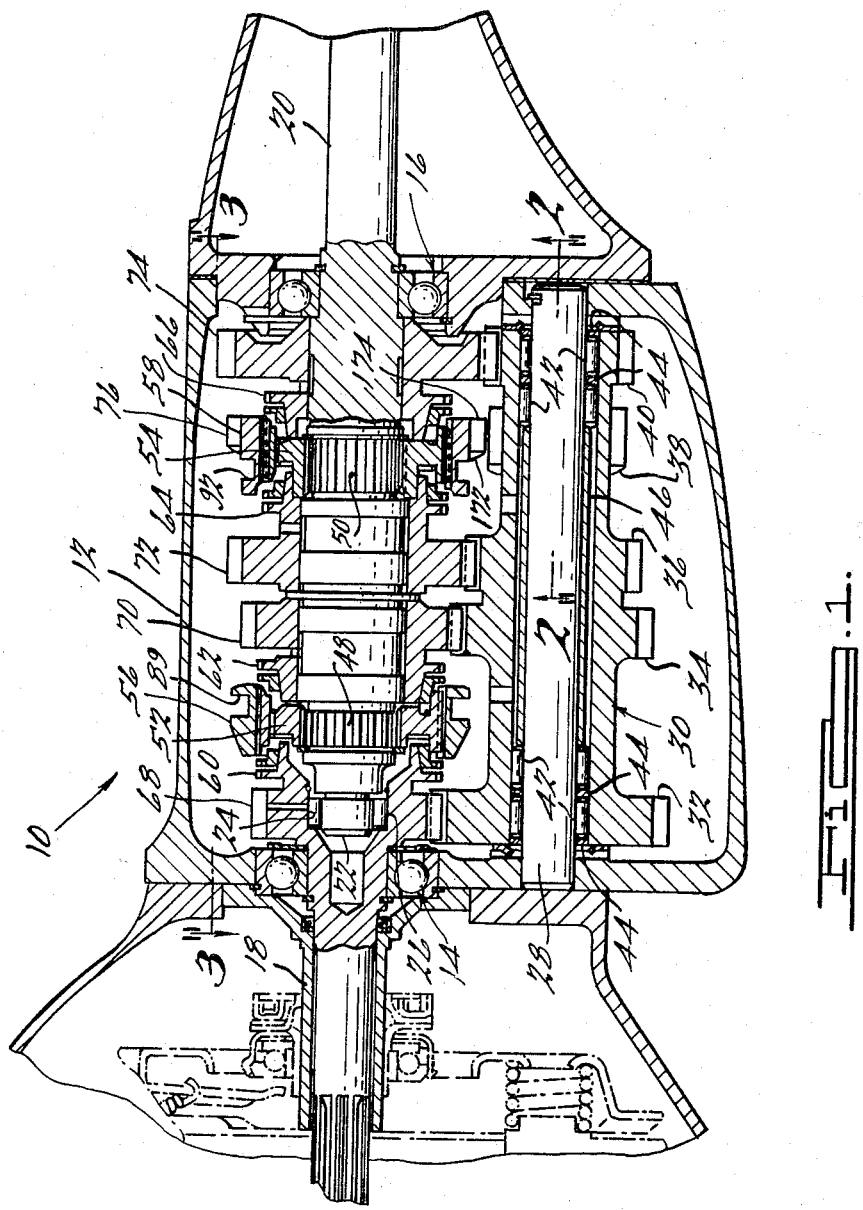

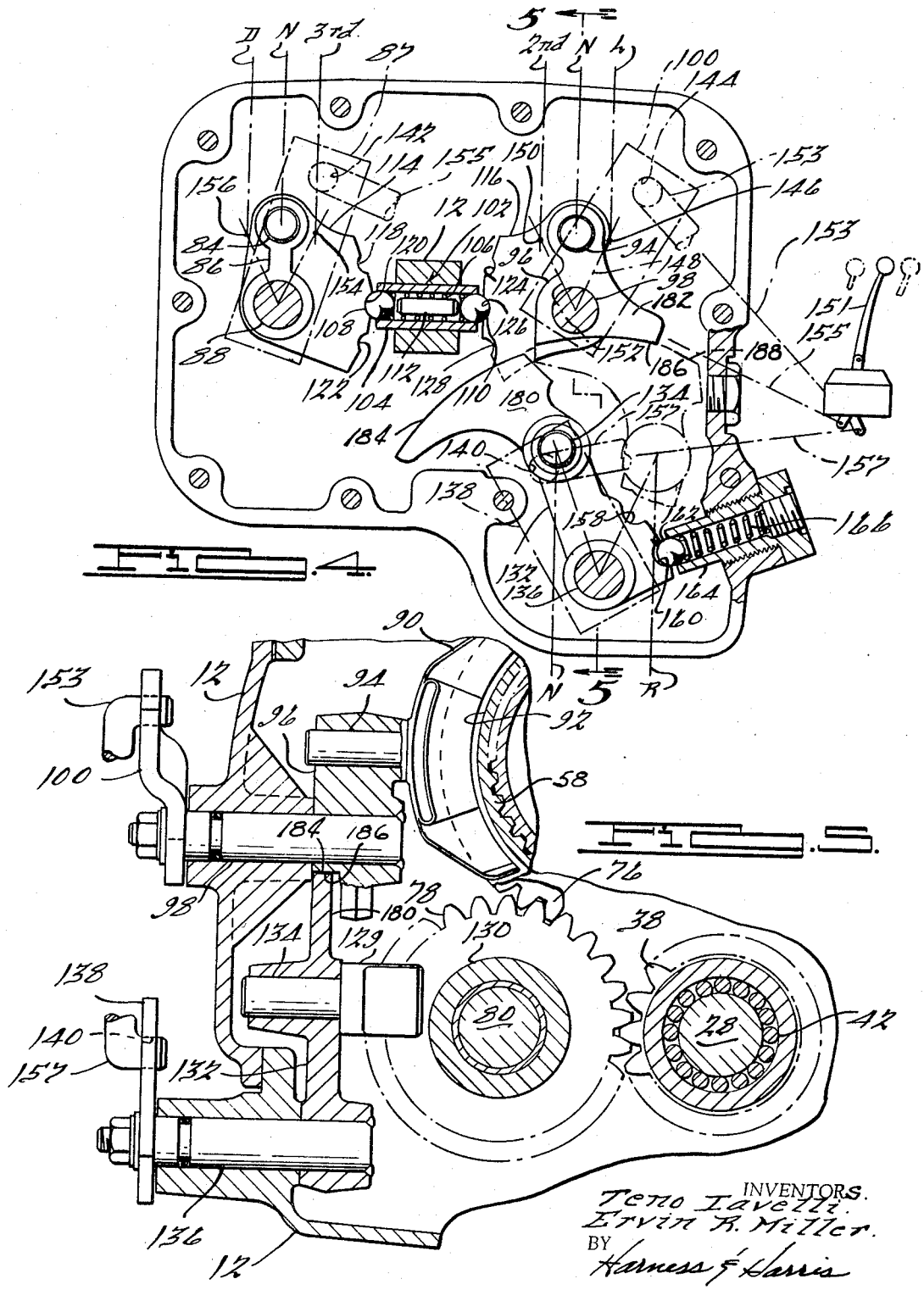

United States Patent Office 3,319,479  
Patented May 16, 1967

3,319,479  
MULTIPLE SPEED POWER TRANSMISSION MECHANISM  
Teno Javelli and Ervin R. Miller, Detroit, Mich., assignors to Chrysler Corporation, Highland Park, Mich., a corporation of Delaware  
Filed Aug. 25, 1964, Ser. No. 392,005  
8 Claims. (Cl. 74—333)

This invention relates generally to a multiple speed power transmission mechanism and more particularly to such a mechanism having manually operated means for changing and selecting transmission speeds.

In a conventional multiple speed transmission having synchronized gears and a cluster gear assembly, a sliding gear is employed for selectively engaging individual gears of the cluster assembly to the transmission output shaft in order to effect the desired forward speed. In such arrangements, a second sliding gear is employed for completing the low forward speed and reverse speed drive train from the transmission power input shaft to the power output shaft. Generally, this is accomplished by selectively causing the second mentioned sliding gear to engage either the transmission low forward speed gear or the reverse speed idler gear.

In transmissions of the above type it has been accepted practice to have the reverse speed idler gear engaged continuously with a reverse drive gear of the cluster assembly. The reverse-low speed sliding gear would then be shifted into engagement with the reverse speed idler gear in order to effect a reverse drive through the transmission output shaft.

The above described arrangement has proven to be satisfactory for transmissions having a maximum of three distinct forward speed gears and a reverse gear. However, in transmissions having four or more forward speeds and a reverse gear the reverse-low speed sliding gear is usually required to perform the additional function of completing the drive train through the second forward speed gear in order to minimize the massiveness of the overall transmission assembly.

In order to accomplish this, it has been proposed to provide suitable shifting means for sliding the reverse-low speed sliding gear axially in one direction to one extreme position to effect a low forward speed operation and to axially slide said sliding gear in the opposite direction to a second extreme position to effect a second forward speed operation. Whenever, the said sliding gear would be in a neutral position, that is generally intermediate said extreme positions, it would then be available for engagement by an axially shiftable reverse speed idler gear mounted on a separate shaft.

Although transmissions of this type have proven to be highly reliable, there is a possibility that under certain circumstances and operating conditions the sliding second-low-reverse gear can be caused to simultaneously engage both the low forward speed gear and the reverse speed idler gear while having the reverse idler gear also being in mesh with the cluster gear assembly.

Accordingly, it is a principal object of this invention to provide, in a transmission having multiple forward speeds and one reverse speed, means for preventing the simultaneous engagement of the gears forming the low and intermediate forward speed drive trains with the gears forming the reverse speed drive train.

Another object of this invention is to provide, in a transmission having multiple forward speeds and one reverse speed and wherein a common axially moveable sliding gear is shiftable from a neutral position to one extreme position for completing one forward speed drive train and shiftable to another extreme position for completing another forward speed drive train and wherein a reverse speed idler gear is employed for completing a reverse speed drive train, means for maintaining said sliding gear in said neutral position whenever said reverse speed idler gear is being placed into meshed engagement for effecting said reverse speed drive train.

It is a further object of this invention to provide abutment means effective whenever the transmission reverse speed idler gear is being shifted towards engagement with its cooperating sliding gear to prevent any engagement between such cooperating sliding gear and a forward speed gear.

Other more specific objects and advantages of this invention will become apparent when reference is made to the following description and accompanying drawings wherein:

FIGURE 1 is a cross-sectional assembly view of a four-speed transmission mechanism constructed in accordance with the teachings of this invention;

FIGURE 2 is a cross-sectional view of a portion of the cluster gear assembly of FIGURE 1 and of the transmission reverse idler gear. FIGURE 2 is obtained generally in a plane indicated by line 2—2 of FIGURE 1 with the axis of the reverse idler gear being parallel to the axis of the cluster gear but displaced a distance above the plane of the drawing of FIGURE 1;

FIGURE 3 is a view taken generally on the plane of line 3—3 of FIGURE 1 and looking in the direction of the arrows;

FIGURE 4 is a cross-sectional view taken generally on the plane of line 4—4 of FIGURE 3; and FIGURE 5 is a fragmentary cross-sectional view taken generally on the plane of line 5—5 as indicated on both FIGURES 3 and 4.

Certain details are omitted from some of the figures for purposes of clarity.

Referring now in greater detail to the drawings, the transmission 10 of FIGURE 1 is illustrated as being comprised of a case 12 having coaxially situated bearing assemblies 14 and 16 which respectively serve to journal one end of a transmission input shaft 18 and a main shaft 20. The inner most end 22 of shaft 20 is piloted within a suitable bore 24 of input shaft 18 as by bearings 26.

A countershaft 28, suitably journaled in the case 12, rotatably supports a gear cluster 30 comprised of gears 32, 34, 36, 38 and 40. Cluster 30 may be supported on countershaft 28 as by a plurality of bearings 42 axially separated as by spacers 44 and 46.

Splined portions 48 and 50, formed on mainshaft 20, slidably receive hubs 52 and 54 as by means of internally formed splines. Clutch sleeves 56 and 58 are slidingly engaged with external splines formed on the periphery of hubs 52 and 54 and are adapted to be selectively engaged with any of the clutch teeth 60, 62, 64 and 66 of gears 68, 70, 72 and 74, respectively.

Gear 68, a top or fourth speed gear, is in constant mesh with gear 32 of cluster 30; the third speed gear 70 is in constant mesh with gear 34 while the second speed gear 72 and first speed gear 74 are respectively in constant mesh with gears 36 and 40. Gears 70, 72 and 74 are all, of course, freely rotatable on mainshaft 20.

A reverse gear 76 is formed on the outer periphery of clutch sleeve 58 and is adapted to be at times placed into engagement with a reverse idler gear 78 which is slidably and rotatably mounted on an idler shaft 80 illustrated in FIGURE 2.

A shift fork 82, received in a groove 89 and journaled at 84 (FIGURES 3 and 5) within a rocker arm 86 is employed for moving the third and fourth speed clutch sleeve 56 axially so as to engage either the clutch teeth 60 of the fourth speed gear 68 or the clutch teeth 62 of the third speed gear 70. Rocker arm 86 is pivotally supported by and secured to a rocker shaft 88 journaled in the casing 12 and having an actuating or control arm 87 secured thereto. Similarly, a second shift fork 90, received in groove 92 and journaled at 94 within a rocker arm 96 is employed for moving the first and second speed clutch sleeve 58 axially into engagement with either the clutch teeth 64 of second speed gear 72 or clutch teeth 66 of first speed gear 74. Rocker arm 96 is pivotally supported by and secured to a rocker shaft 98 journaled in the casing 12 and having an actuating arm 100 secured thereto externally of said casing.

A spring-loaded interlocking detent assembly 102, carried internally of casing 12, is positioned so as to continuously engage both rocker arms 86 and 96. Detent assembly 102 is comprised of a generally tubular body 104 containing a coiled compression spring 106 which urges, in opposite directions and outwardly therefrom, ball detent members 108 and 110. A pin 112, generally loosely received within spring 106, serves as an abuttable spacer. That is, once either ball 108 or 110 is moved inwardly of body 104, the free space between balls 108 and 110 is consumed by pin 112 thereby preventing the movement of the other ball out of its position with its rocker arm detent recess.

As seen in FIGURES 3 and 4, rocker arm 86 and 96 have generally accurate sector portions 114 and 116, respectively; section 114 has provided thereon peripheral detent recesses 118, 120 and 122 while sector 116 is similarly provided with peripheral detent recesses 124, 126 and 128.

A reverse shifter arm 129, similar to shifter forks 82 and 90, is received within groove 130 of reverse idler gear 78 and journaled within a rocker arm 132 as at 134 for at times moving reverse idler gear 78 axially along shaft 80 into and out of engagement with reverse gears 76 and 38. Further, rocker arm 132 is fixedly secured to a rocker shaft 136 which is rotatably mounted in casing 12. An actuating arm 138, secured to shaft 136 is located externally of casing 12 and adapted as by means of aperture 140 to be operatively connected to suitable manually positioned shift lever operated control linkages. Similarly, actuating arms 87 and 100 are respectively provided with apertures 142 and 144 also for connection to such shift lever operated control linkages.

Selective rotation of the actuating arms 87, 100 and 140, by the manually positioned shift lever operated control linkages, causes the respective selective rotation of rocker arms 86, 96 and 132 with the consequent translative movement of journals 84, 94 and 134. For example, referring to FIGURE 4, if low gear speed is desired the associated manual shift lever through its linkages rotates actuating arm 100 clockwise about the center of shaft 98 until the center of journal 94 assumes a position substantially coincident with point 146 determined by the intersection of lines 148 and L. In order to obtain second gear speed rocker arm 96 is rotated counterclockwise until the center of journal 94 is coincident with point 150 determined by lines 152 and 2nd.

Similarly rotation of rocker arm 86 clockwise or counterclockwise to positions causing the center of journal 84 to respectively assume positions coincident with points 154 and 156 would result in third gear speed and fourth gear speed (or direct drive speed) operation, respectively. Further, reverse idler gear 78 and its associated rocker arm 132 have two positions, one of which is the reverse idler gear disengaged position as illustrated in FIGURE 4 and the other being the engaged or in mesh position as illustrated generally by FIGURE 5 and also in phantom line in FIGURE 4.

It should of course be apparent that as any one of the rocker arms is rotated to a particular selected gear-engaging position, as by the manually positioned shift lever 151 and the shift-lever-operated linkages 153, 155 and 157, that the other two rocker arms must be maintained in a neutral position as indicated generally by the respective lines, N.

The reverse idler gear rocker arm or lever 132 is also provided with detent-receiving recesses 158 and 160 which alternately receive a ball detent 162 contained generally by a detent body 164 containing therein a coiled compression spring 166 which urges ball 162 outwardly therefrom and into selective engagement with recesses 158 and 160.

As the reverse lever 132 is rotated clockwise about the axis of shaft 136 by the corresponding movement of actuating arm 138, shifter arm 129 is moved generally to the right causing reverse idler gear 78 to be moved from its disengaged position, indicated in phantom line in FIGURE 2, to its engaged position wherein it is in mesh with gear 38 of cluster 30, as also shown in FIGURE 2. As the reverse idler gear 78 is thusly being moved, a possibility exists of having the leading edge 168 of teeth 170 strike, in a generally abutting manner, the edge 172 of teeth 174 of the gear 76. If the shifting of reverse idler gear 78 into engagement with gear 38 of cluster 30 and towards engagement with reverse gear 76 is accomplished with sufficient force or at a relatively high velocity and if the gear teeth edges 168 and 172 do abut as described above, it becomes apparent that gear 76 will be urged axially toward the right as viewed in either of FIGURES 1 or 3. If a sufficient force were thusly applied to gear 76 it could overcome the restraining effect of ball detent 110 and move axially an amount sufficient to cause engagement between the first speed gear clutch teeth 66 and the splines formed internally of the clutch sleeve 58. Since first speed gear 74 is in constant mesh with cluster gear 40, such engagement between first speed gear clutch teeth 66 and clutch sleeve 58 would result in the completion of a drive train comprised of input shaft 18, top or fourth speed gear 68, cluster gear 32, cluster 30, first speed cluster gear 40, first speed gear 74, clutch sleeve 58, hub 54 and output shaft 20.

In view of the above, it can be seen that it is possible to obtain low or first speed gear operation whereas, in fact, reverse speed gear operation was desired. It is a further possibility that the above can be complicated by not only obtaining first speed gear operation but also causing meshing engagement between the reverse idler gear 38 (which has already because of its axial movement become meshed with reverse cluster gear 38) and teeth 174 of clutch sleeve 58. If this should happen, the rotation of output shaft 20 would be stopped since reverse gear 76, reverse speed idler gear 78 and reverse cluster gear 38 would tend to be operating at one predetermined speed ratio while cluster gear 40 and low speed gear 74 would tend to be operating at a second speed ratio different from said predetermined ratio. Gears 76 and 74, under the assumed conditions, are locked to each other by clutch teeth 66 thereby causing a locking of the entire transmission.

Accordingly the invention as herein disclosed provides abutment means effective whenever the transmission's reverse speed idler gear 78 is being shifted toward engagement with its cooperating sliding reverse gear 76 to prevent, at such time, any engagement between such sliding gear and the low forward speed gear 74.

Such abutment means, sometimes referred to as a reverse gear blocker, takes the form of arcuate segments 180 and 182 which respectively have convex and concave peripherally formed abutment surfaces 184 and 186. The abutment portion 180, which may be formed integrally with reverse lever 132, is adapted to be pivoted about the axis of shaft 136 whenever the actuating arm 130 is correspondingly rotated as best seen in FIGURE 4. When the reverse lever 132 is rotated from its position shown in the solid line (neutral position) to the position indicated in phantom line at 188 (reverse speed drive train completed) then abutment surface 184 swings into juxtaposition with abutment surface 186 of the first-second speed lever 96. From FIGURE 4 it can be appreciated that shortly after clockwise rotation of reverse shift lever 132 is initiated the two cooperating abutment portions 180 and 182 and their respective abutment surfaces are brought into such relative positions as to effectively prevent rotation of the first-second speed lever 96 about the axis of its shaft 98. Shift lever 96, of course, carries the journal 94 which supports the first-second shifter fork 90 which in turn controls the position of reverse gear 76 (see also FIGURE 5). Accordingly, if rotation of lever or arm 96 is precluded by the cooperating action of abutments 180 and 182 it therefore follows that the possible abutting of edges 168 of teeth 170 with the edges 172 of teeth 174 will not result in sliding gear 76 being dislodged axially from its proper position and into engagement with clutch teeth 66 of the low speed gear 74.

In FIGURE 5 the arcuate abutment portion 180 is shown in cross section and is slightly out of position, as compared to its position illustrated in FIGURE 4, in order to better illustrate the relationship existing between abutment surfaces 184 and 186 as, for example, when the reverse shifter lever 132 is being moved towards or into reverse speed gear operation. For purposes of illustration and even though teeth 174 of gear 76 are not in the plane of the section indicated by line 5—5 of either FIGURES 3 or 4, a fragment of gear 76 is illustrated so as to show the general meshed engagement of reverse idler gear 78 with reverse gear 76 and reverse cluster gear 32. It should, of course, be apparent that the fragmentary portion of gear 76 is in effect an integral part of the clutch sleeve 58 which has the groove 92 formed therein for the accommodation of the first-second forward speed shifter fork 90.

In view of the above, it is apparent that the invention and the preferred embodiment thereof disclosed herein, provides a simple and yet positive means for preventing the accidental multiple simultaneous engagement of gears which form both forward and reverse drive trains through the transmissions. As has been previously discussed such simultaneous completion of oppositely directed drive trains would cause, at a minimum, the complete locking of the transmission.

Although but one embodiment of the invention has been disclosed and described, it is apparent that other embodiments and modifications of the invention are possible within the scope of the appended claims.

We claim:

1. A multiple speed transmission mechanism comprising rotatable input and output shafts; a cluster gear assembly including gear portions journaled on an axis parallel to the axes of said input and output shafts; a plurality of separate gears freely journaled on said output shaft and in continuous meshed engagement with said gear portions, respectively; first manually actuated means for causing selective engagement of said separate gears to said output shaft in order to cause rotation of said output shaft in one direction; second manually actuated means for causing a separately journaled reverse idler gear to become in meshed engagement with a selected one of said gear portions and a selected one of said separate gears for causing rotation of said output shaft in a direction opposite to said one direction; and abutment means carried by both said first and second manually actuated means for preventing the simultaneous engagement among said selected one of said gear portions, said reverse idler gear, said selected one of said separate gears and another of said separate gears; said abutment means comprising a first arcuate member carried by said first manually actuated means and a second arcuate member carried by said second manually actuated means; said first and second arcuate members having formed thereon first and second contoured abutment surfaces, respectively, which are complementary to each other; said contoured abutment surfaces being effective upon being brought into juxtaposition to each other to prevent actuation of said first manually actuated means.

2. In a multiple speed power transmission mechanism having a power input shaft, a power output shaft with first and second forward speed gears freely journaled on said power output shaft and continuously in mesh with respective first and second speed gear portions carried in a cluster gear assembly and a manually axially positionable clutch member adapted for manual actuation to positions whereat driving engagement is achieved between said first forward speed gear and said power output shaft or driving engagement is achieved between said second forward speed gear and said power output shaft or where no driving engagement is achieved between either said first or second forward speed gear and said power output shaft, a third gear formed peripherally about said clutch member and movable therewith, a reverse idler gear manually positionable into operative engagement with both a third gear portion on said cluster assembly, and said third gear whenever said clutch member is in one of said positions whereat no driving engagement is achieved between either said first or second forward speed gear in order to achieve reverse drive operation of said output shaft, first lever means operatively connected to said clutch for shifting said clutch to any of said operating positions, second lever means operatively connected to said reverse idler gear for shifting said idler gear into said operative engagement, and abutment means carried by said second lever means for preventing the actuation of said first lever means whenever said second lever means is being moved toward a position causing engagement between said reverse idler gear and said third gear.

3. In a multiple speed power transmission mechanism having a power input shaft, a power output shaft with first and second forward speed gears freely journaled on said power output shaft and continuously in mesh with respective first and second speed gear portions carried in a cluster gear assembly and a manually axially positionable clutch member adapted for manual actuation to positions whereat driving engagement is achieved between said first forward speed gear and said power output shaft or driving engagement is achieved between second forward speed gear and said power output shaft or where no driving engagement is achieved between either said first or second forward speed gear and said power output shaft, a third gear formed peripherally about said clutch member and movable therewith, a reverse idler gear manually positionable into operative engagement with both a third gear portion on said cluster assembly, and said third gear whenever said clutch member is in one of said positions whereat no driving engagement is achieved between either said first or second forward speed gear in order to achieve reverse drive operation of said output shaft, first lever means operatively connected to said clutch for shifting said clutch to any of said operating positions, second lever means operatively connected to said reverse idler gear for shifting said idler gear into said operative engagement, and abutment means carried by said first and second lever means for preventing the actuation of said first lever means whenever said second lever means is being moved toward a position causing engagement between said reverse idler gear and said third gear.

4. In a multiple speed power transmission mechanism having a power input shaft, a power output shaft with first and second forward speed gears freely journaled on said power output shaft and continuously in mesh with respective first and second speed gear portions carried in a cluster gear assembly and a manually axially positionable clutch member adapted for manual actuation to positions whereat driving engagement is achieved between said first forward speed gear and said power output shaft or driving engagement is achieved between said second forward speed gear and said power output shaft or where no driving engagement is achieved between either said first or second forward speed gear and said power output shaft, a third gear formed peripherally about said clutch member and movable therewith, a reverse idler gear manually positionable into operative engagement with both a third gear portion on said cluster assembly, and said third gear whenever said clutch member is in one of said positions whereat no driving engagement is achieved between either said first or second forward speed gear in order to achieve reverse drive operation of said output shaft, first lever means operatively connected to said clutch for shifting said clutch to any of said operating positions, second lever means operatively connected to said reverse idler gear for shifting said idler gear into said operative engagement, and abutment means carried by said second lever means for preventing the actuation of said first lever means whenever said second lever means is being moved toward a position causing engagement between said reverse idler gear and said third gear, said abutment means comprising a swingable arcuate segment which segment is placed in juxtaposition to said first lever means for preventing actuation thereof by rotation of said first lever means.

5. In a multiple speed transmission having a slidable gear selectively engageable with a plurality of cooperating gears for providing forward speeds of stepped ratios and wherein said slidable gear is also adapted for engagement by a separate reverse idler gear for providing reverse speed operation, manual shift control means, first actuating linkage means operatively connecting said control means to said slidable gear, second actuating linkage means operatively connecting said control means to said reverse idler gear, and first and second abutment means carried respectively by said first and second actuating linkage means for preventing engagement of said slidable gear and said plurality of cooperating gears whenever said second actuating linkage means has been moved to a position causing said slidable gear to be operatively engaged with said reverse idler gear, and said first abutment means preventing the actuation of said reverse idler gear towards its position of engagement with said slidable gear whenever said first actuating linkage means has caused said slidable gear to be in operative engagement with any of said plurality of cooperating gears.

6. A multiple speed transmission mechanism comprising a casing, power input and power output shafts concentrically journaled in said casing, a cluster gear assembly rotatably journaled in said casing about an axis parallel to the axes of said input and output shafts, a first gear fixedly secured to said input shaft for forced rotation therewith, a driven gear formed on said cluster assembly continually in meshed engagement with said first gear, a low speed forward drive gear freely rotatably journaled on said output shaft, a second speed forward drive gear freely rotatably journaled on said output shaft and spaced axially along said output shaft away from said low speed gear, a first generally axially directed splined portion formed on said output shaft intermediate said low and second speed gears, an internally splined first hub member received on said first splined portion, first peripheral axially directed splines formed on said hub adapted to slidingly engage internally formed splines of a first clutch sleeve, a circumferential groove formed in said first clutch sleeve for receiving therein at least a part of a yoke portion of a first shifter fork, first clutch teeth on said low speed gear, second clutch teeth on said second speed gear, a second generally axially directed splined portion formed on said output shaft, a third speed forward drive gear freely rotatably journaled on said output shaft axially intermediate said second speed gear and said second splined portion, an internally splined second hub member received on said second splined portion, second axially directed splines formed peripherally on said second hub and adapted to slidingly engage internally formed splines of a second clutch sleeve, a circumferential groove formed in said second clutch sleeve for at least partly receiving therein a second shifter fork, clutch teeth carried by said first gear, third clutch teeth on said third speed forward drive gear, a low speed cluster gear in said cluster assembly in continuous meshed engagement with said low speed forward gear, a second speed cluster gear in said cluster assembly in continuous meshed engagement with said second speed forward gear, a third speed cluster gear in said cluster assembly in continuous meshed engagement with said third speed forward gear, manual shift control means, a first shaft extending through and journaled in a wall of said casing, a first lever secured to said first shaft externally of said casing and connected to first linkage means operatively connected to said manual shift control means, a first interior lever fixedly secured to said first shaft internally of said casing, first bearing means formed in said first interior lever so as to rotatably journal and carry said second shifter fork, a first generally arcuate segment formed on said first interior lever extending generally radially of the axis of said first shaft, a plurality of first spaced recesses formed in the periphery of said arcuate segment, a second shaft extending through and journaled in said wall of said casing, a second external lever secured to said second shaft externally of said casing and connected to second linkage means operatively connected to said manual shift control means, a second interior lever fixedly secured to said second shaft internally of said casing, second bearing means formed in said second interior lever so as to rotatably journal and carry said first shifter fork, a second generally arcuate segment formed on said second interior lever extending generally radially of the axis of said second shaft, a plurality of second spaced recesses formed in the periphery of said second arcuate segment, a first detent assembly positioned generally between said first and second arcuate segments, said first detent assembly comprising a body containing first and second movable detent members, resilient means contained within said body urging said first detent member toward engagement with said first recesses and urging said second detent member toward engagement with said second recesses, a spacer carried by said body for preventing more than one of said detent members to be displaced from a cooperating recess at only one time, a third shaft extending through and journaled in a wall of said casing, a third external lever secured to said third shaft externally of said casing and connected to third linkage means operatively connected to said manual shift control means, a third interior lever secured to said third shaft internally of said casing, a reverse speed idler gear rotatably mounted in said casing about an axis parallel to the axis of said cluster assembly, a third circumferential groove formed in said idler gear, a reverse shifter arm journaled in and carried by said third interior lever and at least partly received in said third circumferential groove, a reverse speed cluster gear, a third generally arcuate segment formed on said third interior lever extending generally radially of the axis of said third shaft, a plurality of third recesses formed in the periphery of said third arcuate segment, a second detent assembly comprising a third detent member and resilient means urging said third detent member toward said third recesses, a reverse speed drive gear formed on and carried by said first clutch sleeve, said reverse shifter arm being effective upon rotation of said third interior lever to move said reverse idler gear axially into meshed engagement with said reverse speed cluster gear and said reverse drive gear, and cooperating abutment means formed on said second and third interior levers for preventing rotation of said second interior lever during such periods as when said third interior lever is being rotated towards a position of meshed engagement between said reverse idler gear, reverse speed cluster gear and reverse drive gear, said abutment comprising a generally fourth arcuate segment formed on a swingable end of said third interior lever and having an outer peripheral surface on a first circle whose center is substantially coincident with the axis of said third shaft, and a generally fifth arcuate segment formed on a swingable end of said second interior lever having an abutment surface which is on a second circle whose center is also substantially coincident with the axis of said third shaft but whose radius is slightly greater than the radius of said first circle so as to permit said outer peripheral surface to be at times swung about the axis of said third shaft and into juxaposition with said abutment surface.

7. A multiple speed transmission mechanism comprising a casing, power input and power output shafts journaled in said casing, a cluster gear assembly rotatably journaled in said casing about an axis parallel to the axes of said input and output shafts, a first gear fixedly secured to said input shaft for forced rotation therewith, a driven gear formed on said cluster assembly continually in meshed engagement with said first gear, a low speed forward drive gear freely rotatably journaled on said output shaft, a second speed forward drive gear freely rotatably journaled on said output shaft and spaced axially along said output shaft away from said low speed gear, a generally axially directed splined portion formed on said output shaft intermediate said low and second speed gears, an internally splined hub member received on said splined portion, first peripheral axially directed splines formed on said hub adapted to slidingly engage internally formed splines of a clutch sleeve, a circumferential groove formed in said clutch sleeve for receiving therein at least a part of a first shifter member, a low speed cluster gear in said cluster assembly in continuous meshed engagement with said low speed forward gear, a second speed cluster gear in said cluster assembly in continuous meshed engagement with said second speed forward gear, manual shift control means, a first shaft extending through and journaled in said wall of said casing, a first external lever secured to said first shaft externally of said casing and connected to first linkage means operatively connected to said manual shift control means, a first interior lever fixedly secured to said first shaft internally of said casing, first bearing means formed in said first interior lever so as to rotatably journal and carry said first shifter member, a generally arcuate segment formed on said first interior lever extending generally radially of the axis of said first shaft, a plurality of spaced recesses formed in the periphery of said arcuate segment, a detent assembly positioned generally in close proximity to said arcuate segment, said detent assembly comprising a body containing a movable detent member, resilient means contained within said body urging said detent member toward engagement with said recesses, a second shaft extending through and journaled in a wall of said casing, a second external lever secured to said second shaft externally of said casing and connected to second linkage means operatively connected to said manual shift control means, a second interior lever secured to said second shaft internally of said casing, a reverse speed idler gear rotatably mounted in said casing about an axis parallel to the axis of said cluster assembly, a reverse shifter arm journaled in and carried by said third interior lever and operatively connected to said reverse speed idler gear, a reverse speed cluster gear, a reverse speed drive gear formed on and carried by said first clutch sleeve, said reverse shifter arm being effective upon rotation of said third interior lever to move said reverse idler gear axially into meshed engagement with said reverse speed cluster gear and said reverse drive gear, and cooperating abutment means formed on said first and second interior levers for preventing rotation of said first interior lever during such periods as when said second interior lever is being rotated towards a position of meshed engagement between said reverse idler gear, reverse speed cluster gear and reverse drive gear, said abutment means comprising a generally second arcuate segment formed on a swingable end of said second interior lever and having an outer peripheral surface on a first circle whose center is substantially coincident with the axis of said second shaft, and a generally third arcuate segment formed on a swingable end of said first interior lever having an abutment surface which is on a second circle the center of which is also substantially coincident with the axis of said second shaft but whose radius is slightly greater than the radius of said first circle so as to permit said outer peripheral surface to be at times swung about the axis of said second shaft and into juxtaposition with said abutment surface.

8. A multiple speed transmission mechanism comprising a casing, power input and power output shafts concentrically journaled in said casing, a cluster gear assembly rotatably journaled in said casing about an axis parallel to the axes of said input and output shafts, a first gear fixedly secured to said input shaft for forced rotation therewith, a driven gear formed on said cluster assembly continually in meshed engagement with said first gear, a low speed forward drive gear freely rotatably journaled on said output shaft, a second speed forward drive gear freely rotatably journaled on said output shaft and spaced axially along said output shaft away from said low speed gear, a first generally axially directed splined portion formed on said output shaft intermediate said low and second speed gears, an internally splined first hub member received on said first splined portion, first peripheral axially directed splines formed on said hub adapted to slidingly engage internally formed splines of a first clutch sleeve, a first shifter member operatively engaged with said first clutch sleeve, a second generally axially directed splined portion formed on said output shaft, a third speed forward drive gear freely rotatably journaled on said output shaft axially intermediate said second speed gear and said second splined portion, an internally splined second hub member received on said second splined portion, second axially directed splines formed peripherally on said hub and adapted to slidingly engage internally formed splines of a second clutch sleeve, a second shifter member operatively engaged with said second clutch sleeve, a low speed cluster gear in said cluster assembly in continuous meshed engagement with said low speed forward gear, a second speed cluster gear in said cluster assembly in continuous meshed engagement with said second speed forward gear, a third speed cluster gear in said cluster assembly in continuous meshed engagement with said third speed forward gear, manual shift control means, a first shaft extending through and journaled in a wall of said casing, a first lever secured to said first shaft externally of said casing and connected to first linkage means operatively connected to said manual shift control means, a first interior lever fixedly secured to said first shaft internally of said casing, first bearing means formed in said first interior lever so as to rotatably journal and carry said second shifter member, a first generally arcuate segment formed on said first interior lever extending generally radially of the axis of said first shaft, a plurality of first spaced recesses formed in the periphery of said arcuate segment, a second shaft extending through and journaled in said wall of said casing, a second external lever secured to said second shaft externally of said casing and connected to said second linkage means operatively connected to said manual shift control means, a second interior lever fixedly secured to said second shaft internally of said casing, second bearing means formed in said second interior lever so as to rotatably journal and carry said first shifter member, a second generally arcuate segment formed on said second interior lever extending generally radially of the axis of said second shaft, a plurality of second spaced recesses formed in the periphery of said second arcuate segment, a first detent member effective for resiliently and selectively engaging said first recesses, a second detent member effective for resiliently and selectively engaging said second recesses, a third shaft extending through and journaled in a wall of said casing, a third external lever secured to said third shaft externally of said casing and connected to third linkage means operatively connected to said manual shift control means, a third interior lever secured to said third shaft internally of said casing, a reverse speed idler gear rotatably mounted in said casing about an axis parallel to the axis of said cluster assembly, a reverse shifter member journaled in and carried by said third interior lever operatively engaged with said idler gear, a reverse speed cluster gear, a reverse speed drive gear formed on and carried by said first clutch sleeve, said reverse shifter member being effective upon rotation of said third interior lever to move said reverse idler gear axially into meshed engagement with said reverse speed cluster gear and said reverse drive gear, and cooperating abutment means formed on said second and third interior levers for preventing rotation of said second interior lever during such periods as when said third interior lever is being rotated towards a position of meshed engagement between said reverse idler gear, reverse speed cluster gear and reverse drive gear, said abutment comprising a generally third arcuate segment formed on a swingable end of said third interior lever and having an outer peripheral surface on a first circle whose center is substantially coincident with the axis of said third shaft, and a generally fourth arcuate segment formed on a swingable end of said second interior lever having an abutment surface which is on a second circle whose center is also substantially coincident with the axis of said third shaft but whose radius is slightly greater than the radius of said first circle so as to permit said outer peripheral surface to be at times swung about the axis of said third shaft and into juxtaposition with said abutment surface.

References Cited by the Examiner
UNITED STATES PATENTS

| | | | |
|---|---|---|---|
| 2,324,732 | 7/1943 | Slack | 74—477 |
| 3,040,595 | 7/1962 | Osswald | 74—476 |
| 3,173,303 | 3/1965 | Galaniuk | 74—375 |

DAVID J. WILLIAMOWSKY, *Primary Examiner.*

H. S. LAYTON, *Assistant Examiner.*

UNITED STATES PATENT OFFICE
CERTIFICATE OF CORRECTION

Patent No. 3,319,479            May 16, 1967

Teno Iavelli et al.

It is hereby certified that error appears in the above numbered patent requiring correction and that the said Letters Patent should read as corrected below.

Column 8, line 41, for "only" read -- any --.

Signed and sealed this 24th day of September 1968.

(SEAL)
Attest:

Edward M. Fletcher, Jr.             EDWARD J. BRENNER
Attesting Officer            Commissioner of Patents